(12) United States Patent  
Igarashi

(10) Patent No.: US 9,049,332 B2
(45) Date of Patent: Jun. 2, 2015

(54) MANAGEMENT APPARATUS, MANAGEMENT METHOD AND NETWORK SYSTEM

(71) Applicant: CANON KABUSHIKI KAISHA, Tokyo (JP)

(72) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/068,525

(22) Filed: Oct. 31, 2013

(65) Prior Publication Data

US 2014/0139871 A1 May 22, 2014

(30) Foreign Application Priority Data

Nov. 21, 2012 (JP) .................................. 2012-255510

(51) Int. Cl.
*H04N 1/00* (2006.01)
*G06F 3/12* (2006.01)
*G06K 15/02* (2006.01)
*H04N 1/44* (2006.01)

(52) U.S. Cl.
CPC ....... *H04N 1/00973* (2013.01); *H04N 1/00928* (2013.01); *H04N 1/00344* (2013.01); *H04N 1/4433* (2013.01); *H04N 2201/0094* (2013.01)

(58) Field of Classification Search
CPC .................. H04N 1/00973; H04N 1/00928
See application file for complete search history.

(56) References Cited

U.S. PATENT DOCUMENTS

| 2002/0129355 | A1* | 9/2002 | Velten et al. ................... 717/176 |
| 2002/0196451 | A1* | 12/2002 | Schlonski et al. .............. 358/1.1 |
| 2006/0274343 | A1* | 12/2006 | Kennis .......................... 358/1.11 |
| 2008/0059623 | A1* | 3/2008 | Yang et al. ..................... 709/223 |
| 2009/0319643 | A1* | 12/2009 | Crisan ........................... 709/221 |
| 2010/0153532 | A1* | 6/2010 | Ozawa et al. .................. 709/223 |
| 2010/0208295 | A1* | 8/2010 | Sato ............................... 358/1.15 |
| 2011/0216354 | A1* | 9/2011 | Naito ............................. 358/1.15 |
| 2012/0239791 | A1* | 9/2012 | Takamoto ...................... 709/222 |
| 2013/0163035 | A1* | 6/2013 | Kamiya ......................... 358/1.15 |

FOREIGN PATENT DOCUMENTS

| JP | 2006-079214 A | 3/2006 | |
| JP | 2007-310724 | * 11/2007 | ................. G06F 3/12 |
| JP | 2012-238998 | * 12/2012 | ............. H04W 24/00 |

* cited by examiner

*Primary Examiner* — Beniyam Menberu
(74) *Attorney, Agent, or Firm* — Cowan, Liebowitz & Latman, P.C.

(57) ABSTRACT

A management apparatus obtains setting information from a replacement target device. Thereafter, it designates a distribution mode for distributing the setting information to a new device. If a replace mode is designated as the distribution mode, the management apparatus distributes the setting information to the new device and issues a power-off request to the replacement target device. The replacement target device that received the power-off request turns off its own power. The new device that received the setting information reflects the setting information in the new device in accordance with the designated distribution mode.

7 Claims, 17 Drawing Sheets

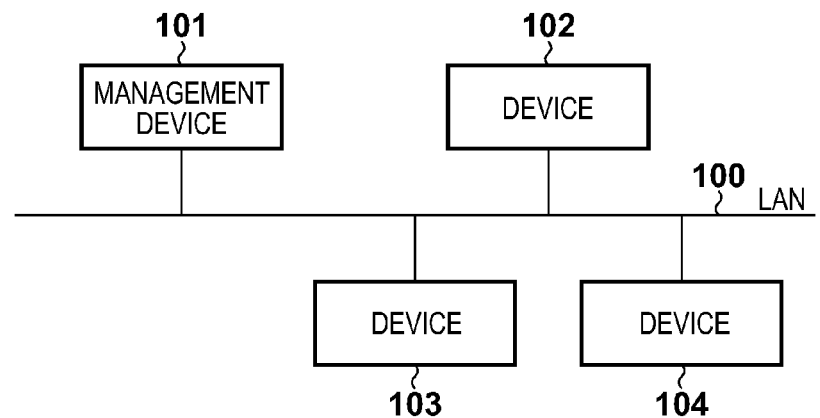
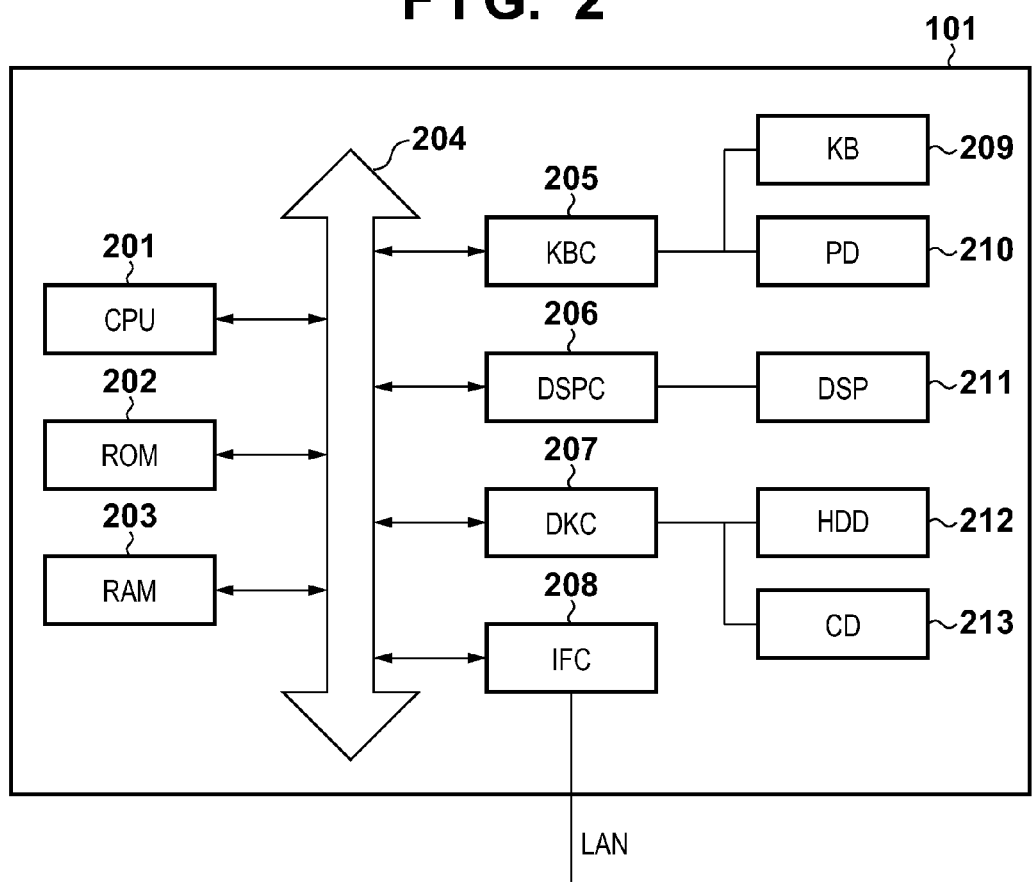

FIG. 7

DEVICE LIST

| SERIAL NUMBER | IP ADDRESS | DEVICE NAME | PRODUCT NAME | LOCATION |
|---|---|---|---|---|
| ABC123 | 10.1.1.10 | DEVICE 102 | MULTI-FUNCTION PRINTER A | GENERAL AFFAIRS DEPT., NORTH |
| ABC456 | 10.1.1.20 | DEVICE 103 | MULTI-FUNCTION PRINTER B | HUMAN RESOURCES DEPT., EAST |
| ABC789 | 10.1.1.30 | DEVICE 104 | MULTI-FUNCTION PRINTER C | HUMAN RESOURCES DEPT., WEST |

FIG. 8

SELECT DEVICE — 800

| | SERIAL NUMBER 801 | IP ADDRESS 802 | DEVICE NAME 803 | PRODUCT NAME 804 | LOCATION 805 |
|---|---|---|---|---|---|
| ⦿ | ABC123 | 10.1.1.10 | DEVICE 102 | MULTI-FUNCTION PRINTER A | GENERAL AFFAIRS DEPT., NORTH |
| ○ | ABC456 | 10.1.1.20 | DEVICE 103 | MULTI-FUNCTION PRINTER B | HUMAN RESOURCES DEPT., EAST |
| ○ | ABC789 | 10.1.1.30 | DEVICE 104 | MULTI-FUNCTION PRINTER C | HUMAN RESOURCES DEPT., WEST |

DEVICE SETTING ITEM LIST 900

| ENTRY NUMBER 901 | OBTAINMENT SOURCE DEVICE IDENTIFIER 902 | SETTING INFORMATION NAME 903 | OBTAINED DATE 904 | IP ADDRESS 905 | DEVICE NAME 906 | LOCATION 907 |
|---|---|---|---|---|---|---|
| 1 | ABC123 | SET VALUE TRANSFER | 2012/01/01 10:00 | 10.1.1.10 | DEVICE 102 | GENERAL AFFAIRS DEPT., NORTH |
| 2 | ABC123 | BACKUP | 2012/01/02 10:00 | 10.1.1.10 | DEVICE 102 | GENERAL AFFAIRS DEPT., NORTH |
| 3 | ABC456 | BACKUP | 2012/01/01 10:00 | 10.1.1.20 | DEVICE 103 | HUMAN RESOURCES DEPT., EAST |

F I G. 10

| | DEVICE UNIQUE SETTING INFORMATION LIST | |
|---|---|---|
| ENTRY NUMBER | UNIQUE ITEM | |
| 1 | DEVICE NAME | |
| 2 | LOCATION | |
| 3 | IP ADDRESS | |

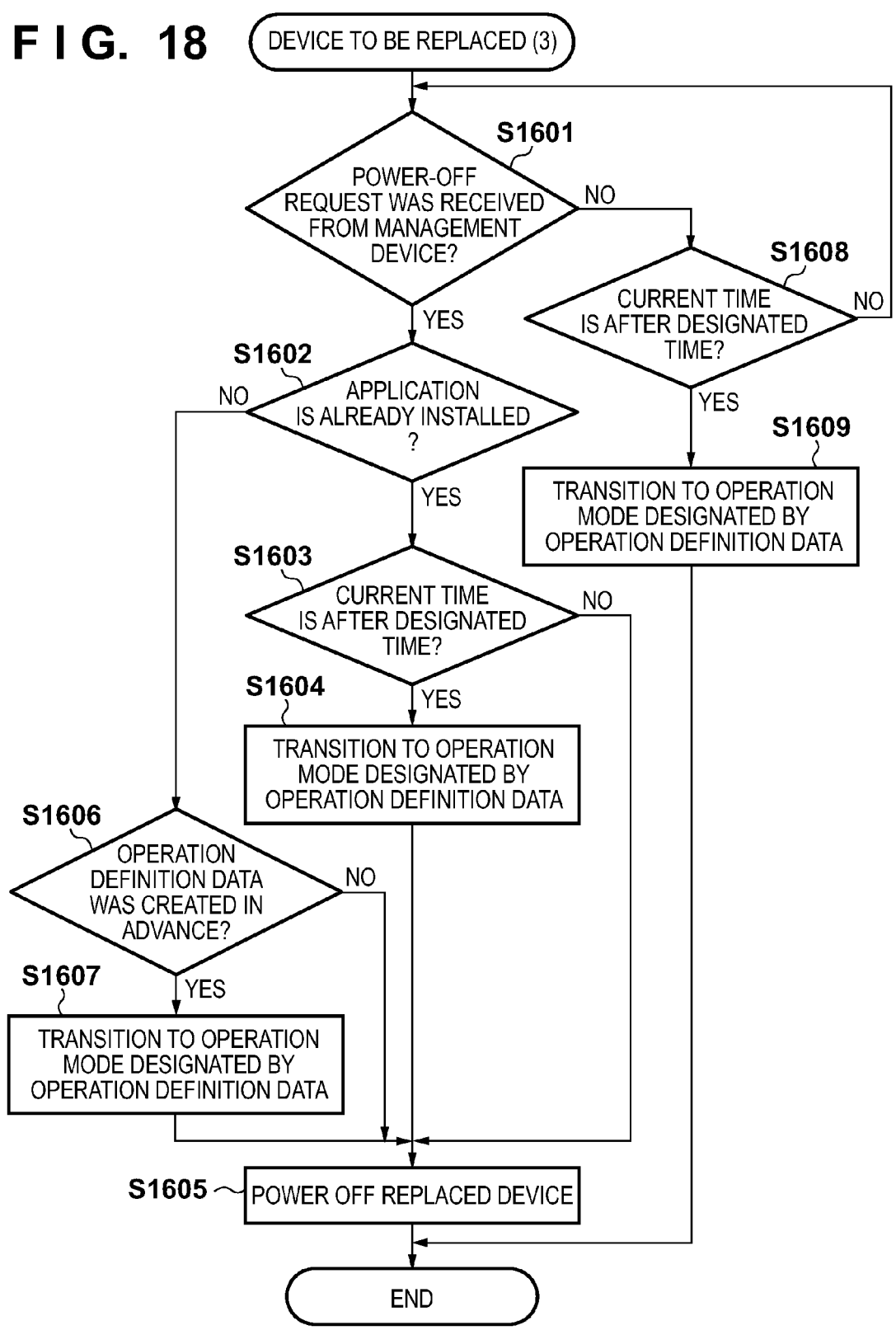

MANAGEMENT APPARATUS, MANAGEMENT METHOD AND NETWORK SYSTEM

BACKGROUND OF THE INVENTION

1. Field of the Invention

The present invention relates to a management apparatus, a management method, and a network system for configuring setting information that is to be unique to each device among various kinds of setting information for devices represented by multi-function printers, for example.

2. Description of the Related Art

In general, devices represented by multi-function printers are installed in a customer environment, and thereafter replaced with latest models as the technology advances, rather than being used permanently. A task of transferring setting items from a replacement target device to a new replacement device needs to be performed to smoothly carry out business after the replacement, but there are several hundreds of setting items to be transferred in some cases, which increases the burden caused by the transferring task.

For this reason, a technique is proposed by which, for example, setting information of each user that was acquired in advance from a replacement target device by an administrator and transfer designation information for designating a transfer method are stored in a predetermined area in a new replacement device (see Japanese Patent Laid-Open No. 2006-079214). A user, when first logging into the new replacement device, transfers the setting information for the replacement target device in accordance with the transfer designation information.

However, in Japanese Patent Laid-Open No. 2006-079214, consideration is not given to a method for transferring device-unique setting information represented by an IP address and a host name. Therefore, a device administrator needs to a device-unique setting information from the replacement target device in addition to the setting information of each user and manually transfer the device-unique setting information to the new replacement device.

Further, consideration is also not given to the case where a defect occurs in a system due to both the replacement target device and the new replacement device existing in the system after the device-unique setting information is transferred. For this reason, the device administrator needs to be careful to prevent both the replacement target device and the new replacement device from existing in the system by, for example, removing the replacement target device, which is a burden on the administrator.

SUMMARY OF THE INVENTION

The present invention provides a management apparatus capable of reducing the burden on an administrator when transferring setting information including device-unique setting information due to device replacement, and capable of securely transferring the setting information.

One aspect of the present invention has the following configuration. That is to say, one aspect of the present invention is a management apparatus for distributing setting information to a network device, comprising: an obtaining unit configured to obtain setting information including unique setting information that is to be unique in a network, from a replacement target network device; a distribution unit configured to designate a replace mode for duplicating the setting information including the unique setting information, and distributing the setting information to a new network device; and a transmission unit configured to transmit an instruction to restrict use of the unique setting information to the replacement target network device.

Another aspect of the present invention is a network system including a network device and a management apparatus for distributing setting information to the network device, the management apparatus comprising: an obtaining unit configured to obtain setting information including unique setting information that is to be unique in a network, from a replacement target network device; a distribution unit configured to designate a replace mode for duplicating the setting information including the unique setting information, and distributing the setting information to a new network device; and a transmission unit configured to transmit an instruction to restrict use of the unique setting information to the replacement target network device, wherein the replacement target network device restricts use of the unique setting information in accordance with the instruction.

According to the present invention, it is possible to transfer the setting information including the device-unique setting information between the devices. It is also possible to prevent devices having identical device-unique setting information from simultaneously existing in the system. Accordingly, it is possible to reduce the burden on an administrator when transferring the setting information including the device-unique setting information due to device replacement, and to securely transfer the setting information.

Further features of the present invention will become apparent from the following description of exemplary embodiments with reference to the attached drawings.

BRIEF DESCRIPTION OF THE DRAWINGS

FIG. 1 is a diagram showing a system configuration in a first embodiment.

FIG. 2 is diagram showing an internal configuration of a management apparatus.

FIG. 7 is a diagram showing an exemplary device list.

FIG. 8 is a diagram showing an exemplary device selection screen.

FIG. 9 is a diagram showing an exemplary device setting information list.

FIG. 10 is a diagram showing an exemplary device-unique setting item list.

FIG. 18 is a flowchart executed subsequently to the flowchart in FIG. 15 (another embodiment).

DESCRIPTION OF THE EMBODIMENTS

First Embodiment

Figure 3:
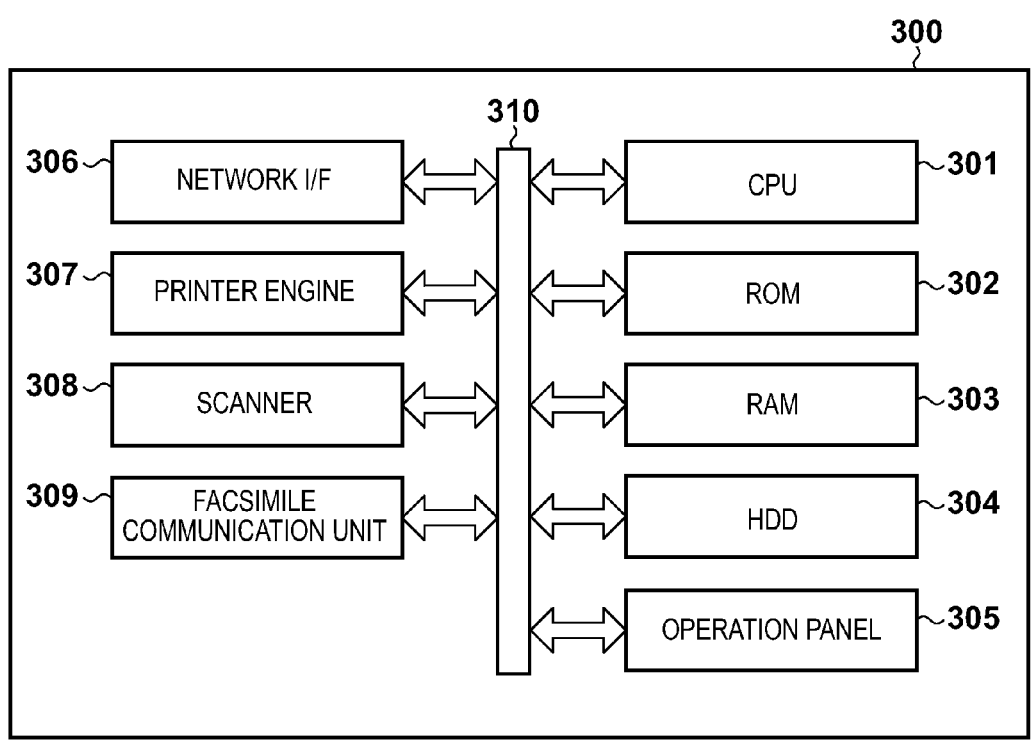
FIG. 3 is a diagram showing an internal configuration of a multi-function printer.

Hereinafter, the best mode for carrying out the present invention will be described using the drawings. The present embodiment will describe an operation in which a management apparatus obtains setting information from a first device (hereinafter referred to as a "replacement target device") and thereafter distributes it to a second device (hereinafter referred to as a "new replacement device", or simply as a "new device") when the replacement target device is replaced with the new device. Note that "new device" refers to a device to be newly used in place of the replacement target device, and is not necessarily limited to an unused device or a latest model device. In the present invention, a set of "setting items" and "set values" will be referred to as "setting information". "Distribution" in the present embodiment is realized by transmission to a target network device, and can also be called "transmission".

System Configuration

FIG. 1 is a diagram showing a configuration of a system in which the management apparatus operates. In the diagram, a management apparatus 101 is connected to a network such as a LAN 100, together with devices 102, 103, and 104, which are represented by multi-function printers. Note that the devices include one that has a later-described processing function associated with transition of an operation mode as a device-unique function, one to which this function can be optionally provided by means of installation of an application (a later-described device transition application), and one that cannot be given this function.

Hardware Configuration of Management Apparatus

FIG. 2 is a diagram illustrating an internal configuration of the management apparatus 101. The management apparatus 101 in the present embodiment is realized on a PC having the same configuration as that of a PC capable of realizing the management apparatus shown in this diagram. A hard disk (HDD) 212 stores a device management software program according to the present embodiment, which will operate throughout the following description.

A CPU 201 operates on hardware throughout the following description, unless stated otherwise. Meanwhile, the device management software stored in the hard disk (HDD) 212 performs control on software.

A ROM 202 stores a BIOS and a boot program. A RAM 203 functions as a main memory, a work area, and the like for the CPU 201. A keyboard controller (KBC) 205 controls input of instructions from a keyboard (KB) 209, a pointing device (PD) 210, and the like. A display controller (DSPC) 206 controls display on a display (DSP) 211. A disk controller (DKC) 207 is for controlling access to storage devices such as the hard disk (HDD) 212 and a CD-ROM (CD) 213. The hard disk (HDD) 212, the CD-ROM (CD) 213, and the like store a boot program, an operating system, databases, a device management program and data thereof, and the like. An interface controller (IFC) 208 transmits and receives information to/from other network devices via a LAN (Local Area Network). These constituent elements are arranged on a system bus 204. Although the present embodiment assumes the OS to be Windows (registered trademark) (manufactured by Microsoft), for example, it is not limited thereto.

Note that the device management program according to the present embodiment may be supplied by storing it in a recording medium such as a CD-ROM. In this case, the program is read out from the recording medium by the CD-ROM (CD) 213 shown in FIG. 2 and installed in the hard disk (HDD) 212.

Exemplary Hardware Configuration of Multi-Function Printer

FIG. 3 is a diagram illustrating an internal configuration of a multi-function printer 300, which is an example of the devices 102, 103, and 104, and has a printing function, a scanning function, a network communication function, and the like. A CPU 301 takes charge of overall control of the multi-function printer. A ROM 302 stores font data and a printing processing program executed by the CPU 301. A RAM 303 is used as a work area for the CPU 301, a receiving buffer, and image rendering. A hard disk 304 stores setting information for the multi-function printer 300 and the like. An operation panel 305 is constituted by various switches and buttons, and a liquid-crystal display unit for displaying a message. With the operation panel 305, a user can manipulate the setting information. A network interface 306 is an interface for connecting the device to a network. A printer engine 307 is for printing on recording paper, and is also referred to as a "printer unit" or the like. A scanner 308 reads out an original. A communication unit 309 is a communication unit for performing facsimile transmission and reception. These constituent elements are arranged on a system bus 310.

Software Configuration of Management Apparatus

Figure 4:
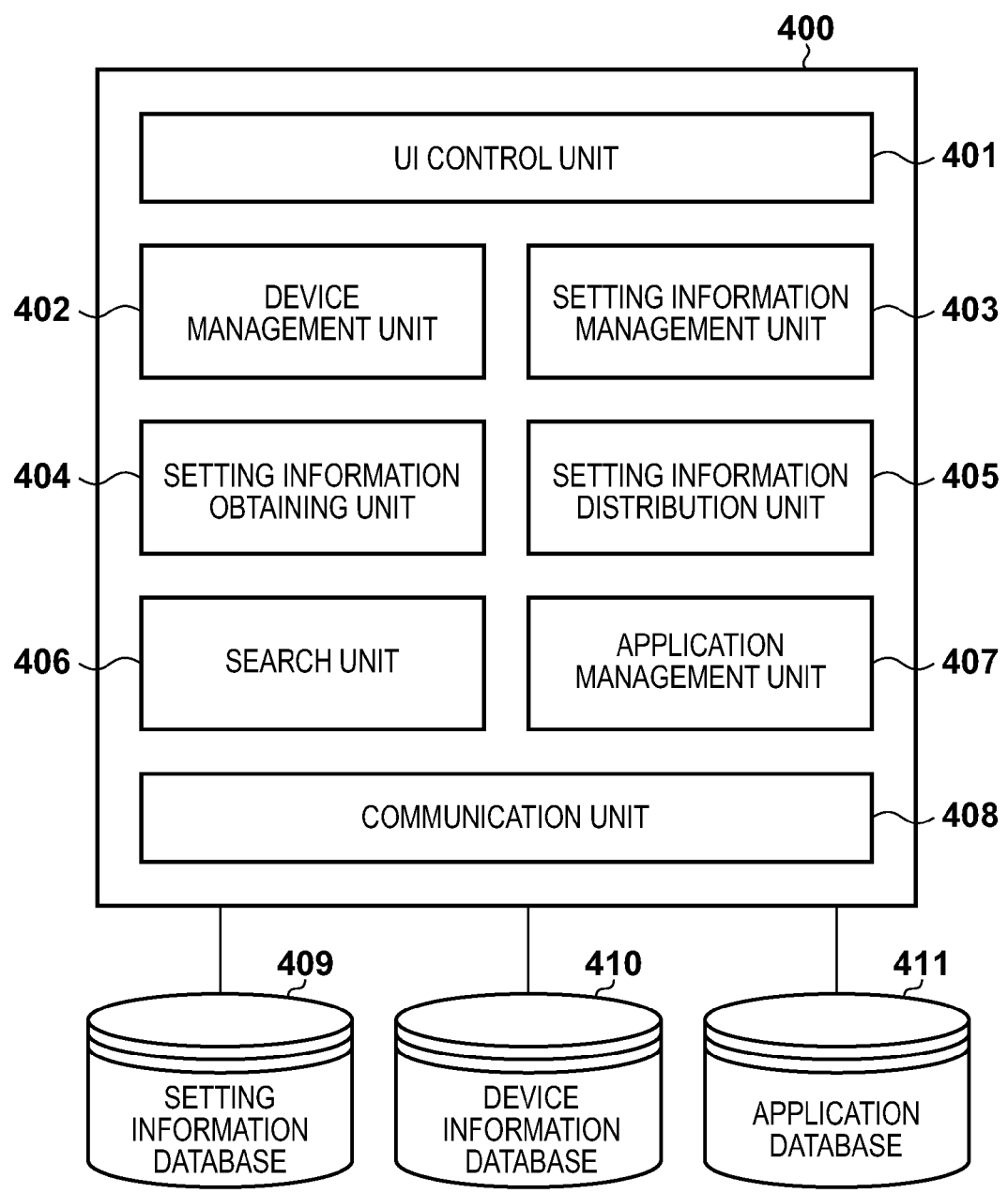
FIG. 4 is diagram showing a software configuration of a management apparatus.

FIG. 4 is a diagram illustrating a configuration of a device management software 400 that operates on the management apparatus 101. A UI control unit 401 provides a graphical user interface for a device administrator to operate this software. The graphical user interface is configured to be displayed on a display 211 provided in the management apparatus 101. Alternatively, it can also be configured as a Web application that can be used from other client PCs using HTTP (HyperText Transfer Protocol).

A device management unit 402 searches for devices connected to the LAN 100, via a search unit 406. Device search can be realized by transmitting a search request packet, such as SLP (Service Location Protocol) or SNMP (Simple Network Management Protocol). Further, detailed information (model name, serial number, capability, status, etc.) regarding a device found as a result of the search can also be obtained via the communication unit 408. Location information (IP address) of the device and the information obtained from the device are stored in a device list on a device information database 410. The information registered on the database can also be viewed by the user via the UI control unit 401.

A setting information management unit 403 obtains the setting information of the device via a setting information obtaining unit 404, and stores it in the setting information database 409. The setting information management unit 403 distributes the setting information stored in the setting information database 409 to the device via a setting information distribution unit 405. The setting information stored in the setting information database 409 can also be viewed by the user via the UI control unit 401.

The setting information obtaining unit 404 obtains the setting information from the device via the communication unit 408. The setting information distribution unit 405 distributes the setting information to the device via the communication unit 408.

Note it is assumed that the setting information obtaining unit 404 and the setting information distribution unit 405 in the present embodiment realize obtaining and distribution of the setting information for the device with a Web service using HTTP/SOAP, but may alternatively realize it with another communication protocol. In the case of obtaining the setting information from the device, a configuration is possible in which only predetermined setting information is obtained, and a configuration is also possible in which setting information selected by the user via the UI control unit 401 is obtained. Similarly, in the case of distributing the setting information to the device, a configuration is possible in which only predetermined setting information is distributed, and a configuration is also possible in which setting information selected by the user via the UI control unit 401 is distributed.

An application management unit 407 manages information of an application file, which will be described later. The application file is constituted by one file that is obtained by compressing a plurality of files, such as a CAB file, a JAR (JavaARchive) file, or a ZIP file. The application management unit 407 also receives the application file from the UI control unit 401, expands the file, and subsequently extracts a manifest file. Thereafter, the application management unit 407 analyzes the manifest file and extracts application attribute information such as an application name, an application ID, and a version. Thereafter, it stores the application attribute information, together with the application file, in an application database 411. Furthermore, the application management unit 407, upon receiving an installation instruction from the UI control unit 401, is connected to the device via the communication unit 408 and executes processing for installing the application in the device. Moreover, the application management unit 407 also executes processing for starting and stopping the installed application.

The setting information database 409, upon receiving a request from the setting information management unit 403, reads or writes the setting information via the RAM 203 or the HDD 212. The device information database 410, upon receiving a request from the device management unit 402, reads or writes device information via the RAM 203 or the HDD 212. The application database 411, upon receiving a request from the application management unit 407, registers or deletes the application via the RAM 203 or the HDD 212.

Application File

Figure 5:
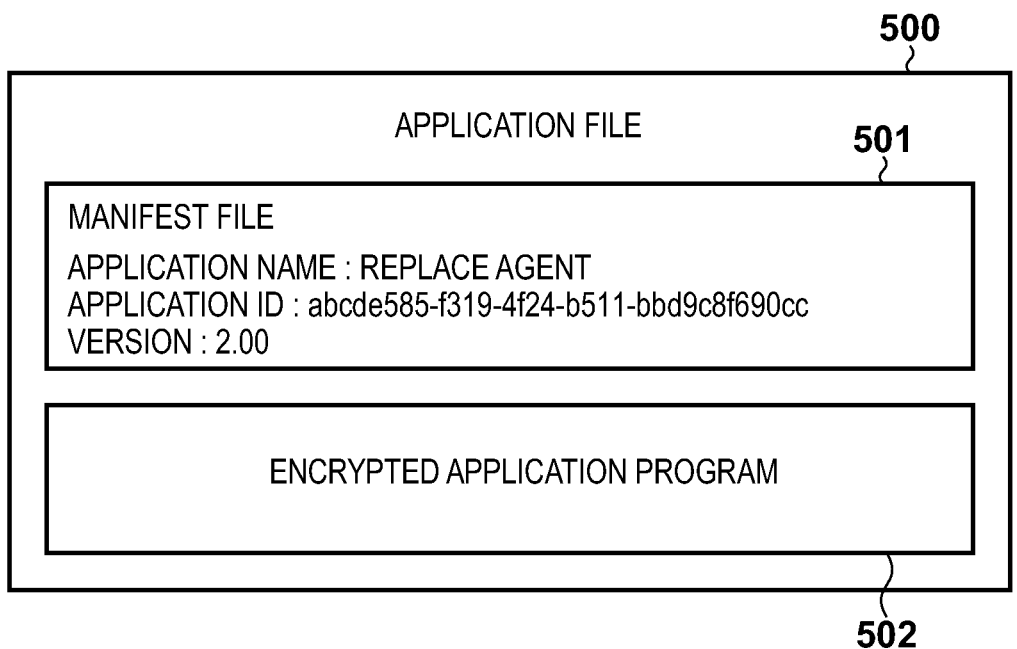
FIG. 5 is a diagram showing an exemplary application file.

FIG. 5 is a diagram illustrating the application file. In this diagram, reference numeral 500 denotes the application file, which is constituted by one file obtained by compressing a plurality of files, such as a CAB file, a JAR (JavaARchive) file, or a ZIP file. A manifest file 501 is stored in the application file 500, and application attribute information such as an application name, an application ID for uniquely identifying the application, and a version is described therein. An application program 502 in the application file 500 is encrypted in order to prevent alteration and the like of the program by a third party. The application file is distributed to its user via a recording medium such as a CD or a media such as the Internet.

Software Configuration of Multi-Function Printer

Figure 6:
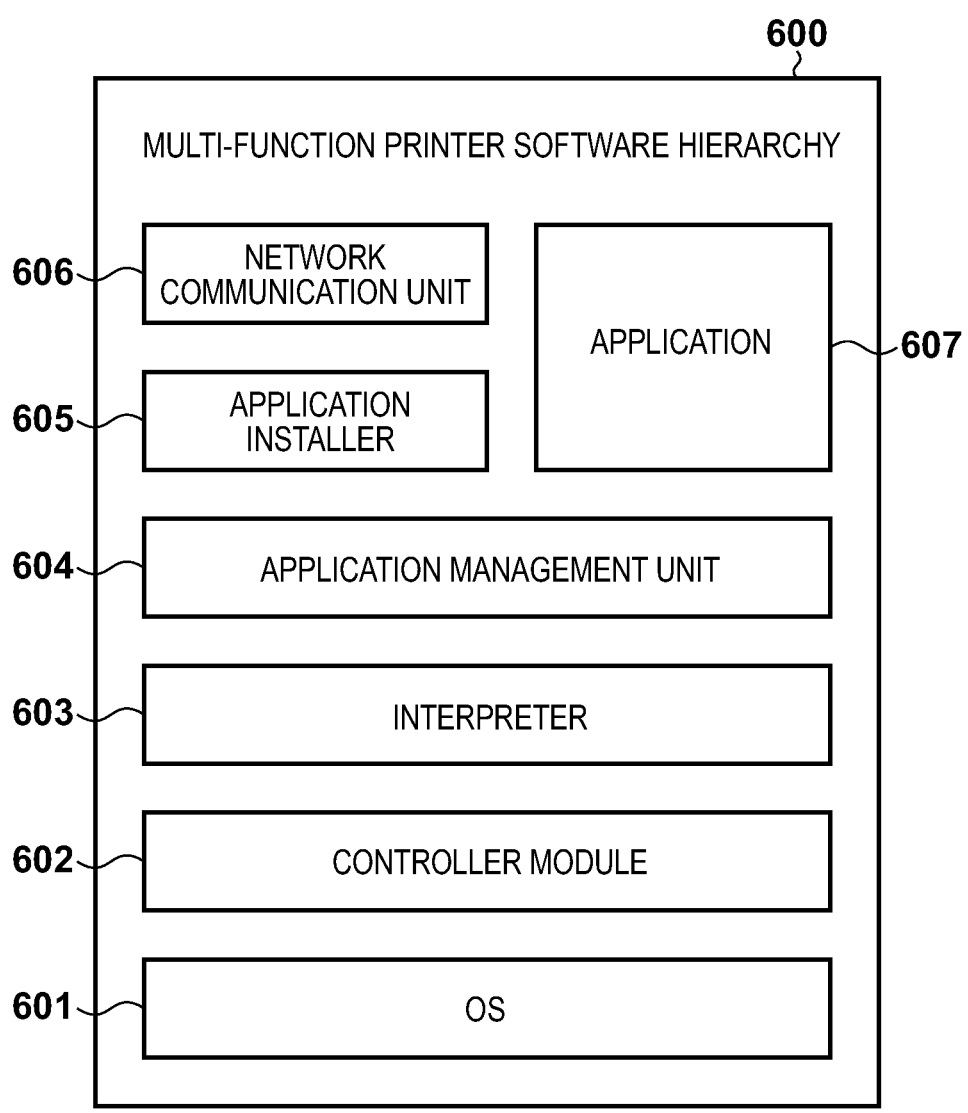
FIG. 6 is a diagram showing a software configuration of the multi-function printer.

FIG. 6 is a diagram illustrating a software configuration of the multi-function printer 300, which is envisioned as an example of the devices 102, 103, and 104. In multi-function printer software 600, an OS 601 is an operating system (OS) of the device. A controller module 602 for controlling various devices is provided above the OS 601, and an interpreter 603 for sequentially executing programs such as the application program is provided above the controller module 602. An application management unit 604 for managing a group of applications that can be dynamically installed/uninstalled is provided above the interpreter 603. An application 607, which is an exemplary application for realizing various functions, operates under the management of the application management unit 604. This application 607 includes the device transition application, which will be described later.

An application provides the user with various kinds of processing in conjunction with the multi-function printer. For example, an application for processing and compressing images, an application for performing departmental management such as print restriction, and the like are exemplary applications. Note that in the present embodiment, an application for managing setting information and a power state of a multi-function printer is envisioned as the application 607.

The application management unit 604 can cause an application module for providing services of the multi-function printer via the interpreter 603 to operate. For example, the application management unit 604 adds the application 607 as a management target in response to installation of the application in the multi-function printer by an application installer 605. Furthermore, the application management unit 604 can remove the application 607 from the management target in response to uninstallation of the application program from the multi-function printer.

The application installer 605 for performing the aforementioned installation and uninstallation can also be caused to operate by the application management unit 604. The application installer 605 obtains the application file from the management apparatus 101 via a network communication unit 606. Thereafter, it checks whether or not the format and information of the application file are proper, and then executes processing for installing the application. It further has a function of authorizing the user who performs access via the network communication unit 606, in order to prevent an installation instruction from an unauthorized user.

Device List

FIG. 7 is an exemplary device list including detailed information of multi-function printers held in the device information database 410. In the device list 700, serial number 701 stores the serial number of each device. IP address 702 stores an IP address of the device. Device name 703 stores a nickname of the device. Product name 704 stores a product name of the device. Installation location 705 stores information about the location where the device is installed. Note that the device list 700 may include information such as an error status and options of the device, in addition to the detailed information 701 to 705.

Examples of Device Selection Screen

FIG. 8 is an exemplary device selection screen displayed by the UI control unit. In the device selection screen 800, serial number 801 displays the value of the serial number 701 in FIG. 7. A radio button is arranged at the head of the serial number such as "ABC123" in order for the UI control unit 401 to accept selection of the replacement target device or the new device by the user. IP address 802 displays the value of the IP address 702 in FIG. 7. Device name 803 displays the value of the device name 703 in FIG. 7. Product name 804 displays the value of the product name 704 in FIG. 7. Installation location 805 displays the value of the installation location 705 in FIG. 7. Note that if the device list 700 stores information other than the detailed information 701 to 705, that information may also be displayed on the device selection screen 800 as necessary. Upon the user selecting a radio button, the UI control unit 401 transfers device selection information to the setting information management unit 403.

Device Setting Information List

FIG. 9 is an exemplary list of setting information for devices held in the device information database 409. In the device setting information list 900, entry number 901 indicates numbers for distinguishing between entries in this table. The value of the entry number may be arbitrary as long as the value allows each entry to be uniquely distinguished from other entries. Acquisition source device identifier 902 indicates an ID of each device from which the setting information is obtained, and normally stores the serial number of the device. Setting information name 903 indicates the name given to the setting information of each entry. The setting information name 903 may be given by the user, or may be automatically given by the management apparatus 101. Acquisition date 904 stores information about the date and time when the setting information of each entry was obtained from the obtaining source device. IP address 905 stores an IP address of each device. Device name 906 stores a nickname that is set for each device. Installation location 907 stores information about the location where each device is installed. Examples of other device setting items may include various operation modes and an address book of each device, but are not limited thereto.

Device-Unique Setting Item List

FIG. 10 is an exemplary list of unique setting information of devices held in the setting information database 409. In the device-unique setting item list 1000, entry number 1001 indicates numbers for distinguishing between entries in this table. Unique item 1002 lists setting items that is to be unique to each device. In this example, a device name, an installation location, and an IP address are listed as the unique setting items.

Procedure for Transferring Device Setting Information by Management Apparatus

Figure 11:
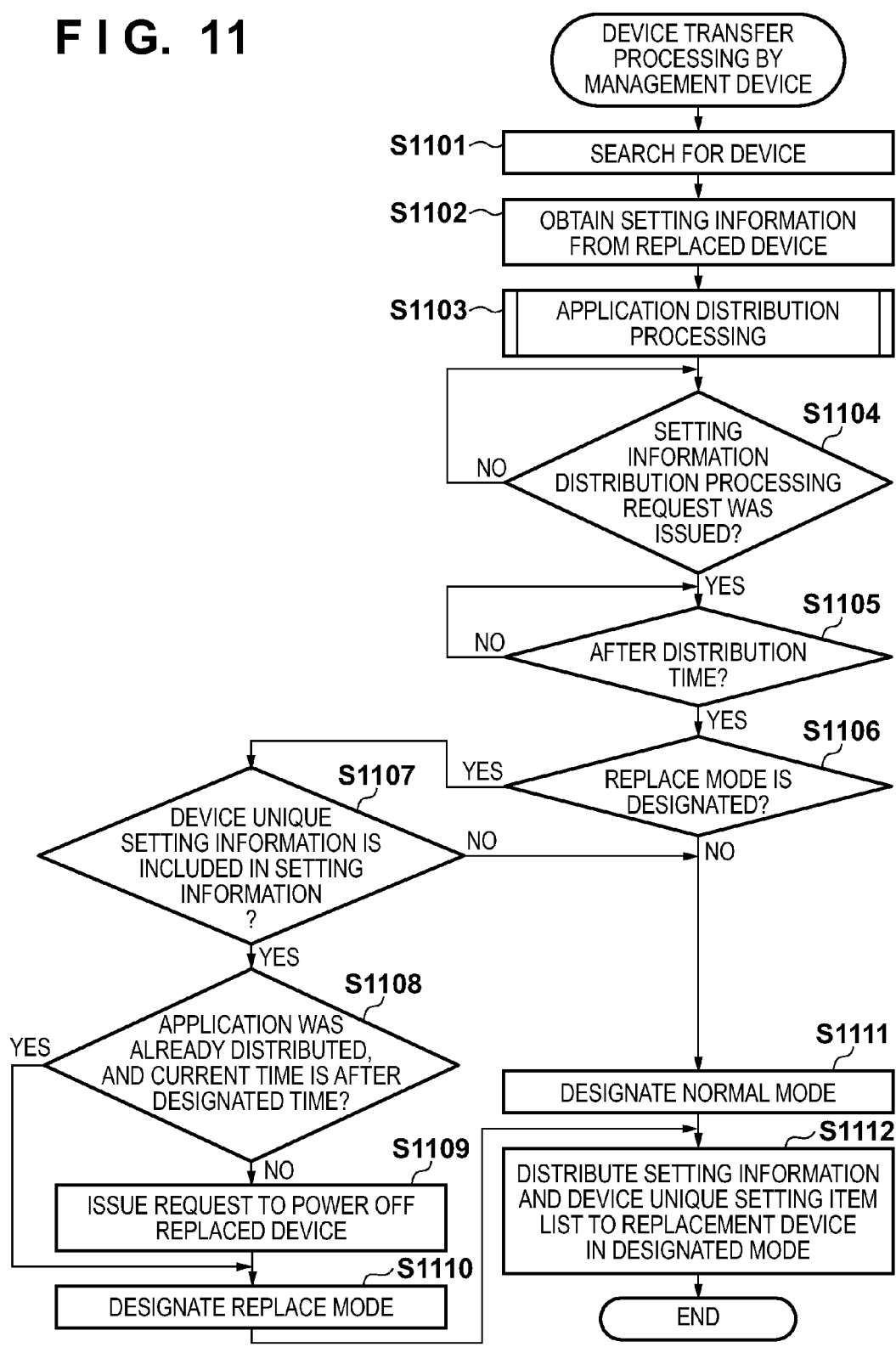
FIG. 11 is a flowchart of the management apparatus in the first embodiment.

In order to transfer the setting information of the replacement target device (e.g., the device 102) to the new device (e.g., the device 104), the CPU 201 in the management apparatus 101 executes a program including the procedure (steps) shown in the flowchart in FIG. 11. For example, the processing of the flowchart is started as a result of the UI control unit 401 detecting a process performed by the user, such as selection of an item for giving an instruction to transfer setting information, from the menu on the UI, and the UI control unit 401 activating the device management unit 402.

In step S1101 in the flowchart, the device management unit 402 searches for a device connected to the network, via the search unit 406. Further, the device management unit 402 obtains detailed information of the device found via the communication unit 408, and holds it in the device list 700 in the device information database 410.

In step S1102, the UI control unit 401 initially displays the device selection screen 800 based on the device list, accepts input by user selection of the replacement target device on the device selection screen 800, and transfers the input result to the device management unit 402. The device management unit 402 specifies the device selected by the user based on the input result, and extracts information of the device from the device information database 410. The device management unit 403 temporarily holds the extracted information in the RAM 203 or the HDD 212. Upon device selection processing being completed, the setting information management unit 403 obtains the setting information from the selected replacement target device (the device 102 in the present embodiment), via the setting information obtaining unit 404. The setting information management unit 403 registers the obtained setting information in the device setting information list 900 in the setting information database 409.

Next, in step S1103, the application management unit 407 executes processing for distributing an application to the replacement target device. The details of the processing in step S1103 will be described with reference to FIG. 12. Note that the application distributed in step S1103 will be referred to as a "device transition application" in the present embodiment.

In step S1104, the setting information management unit 403 determines whether or not a request for distributing the setting information of the replacement target device obtained in step S1102 to the new device was issued. An exemplary screen for creating the setting information distribution request will be described later with reference to FIG. 14. If it is determined that the setting information distribution request was issued, processing proceeds to step S1105. If not, processing returns to step S1104 until the setting information distribution request is issued.

In step S1105, the setting information management unit 403 determines whether or not the current time is after a setting information transfer time designated in step S1103. If it is determined that the current time is after the setting information transfer time, processing proceeds to step S1106. If not, processing returns to step S1105.

In step S1106, the setting information management unit 403 checks the value of a replace mode 1405 held in the RAM 203 or the HDD 212 in step S1104, and determines whether or not the replace mode is designated. If it is determined that the replace mode is designated, processing proceeds to step S1107. If not, processing proceeds to step S1111.

In step S1107, the setting information management unit 403 determines whether or not device-unique setting information is included in the setting information selected by setting information selection 1403. Specifically, the setting information management unit 403 determines whether or not the items indicated in by unique item 1002 in FIG. 10 are included in the setting information selected by setting information selection 1403. If it is determined that the items are included, processing proceeds to step S1108. If not, processing proceeds to step S1111.

In step S1108, the setting information management unit 403 determines whether or not the device transition application was distributed (i.e., whether it has been transmitted) in step S1103 (specifically, in step S1204 in FIG. 12, the details of which will be described later). Furthermore, it also determines whether or not the current time is after the transfer time that was set in step S1103, specifically, the time designated in setting information transfer time 1301 in FIG. 13, which will be described later in detail. If it is determined that the device transition application was distributed and the current time is after the designated time, processing proceeds to step S1110. If not, processing proceeds to step S1109. That is to say, if the device transition application was not distributed, or the current time is not after the designated setting information transfer time, the replacement target device is powered off to prevent duplication of unique settings.

In step S1109, the device management unit 402 issues a power-off request to the device selected in obtaining source device selection 1402, via the communication unit 407. SNMP (Simple Network Management Protocol), a Web service, or the like are envisioned as communication protocol for issuing the power-off request, but it is not limited thereto.

In step S1110, the setting information management unit 403 determines a distribution mode for distributing the setting information to a distribution destination device to be the "replace mode". The setting information management unit 403 temporarily holds the determined distribution mode in the RAM 203 or the HDD 212.

In step S1111, the setting information management unit 403 determines the distribution mode for distributing the setting information to a distribution destination device to be a "normal mode". The setting information management unit 403 temporarily holds the determined distribution mode in the RAM 203 or the HDD 212.

In step S1112, the setting information management unit 403 distributes the setting information and the device-unique setting item list to the new device in accordance with the designation in a distribution request creation screen 1400 and in step S1110 or S1111. This distribution is performed via the setting information distribution unit 405 and the communication unit 407. FTP (File Transfer Protocol), a Web service, or the like are envisioned as the communication protocol used for the distribution, but it is not limited thereto. The description of the flowchart ends here.

Details of Step S1103

Figure 12:
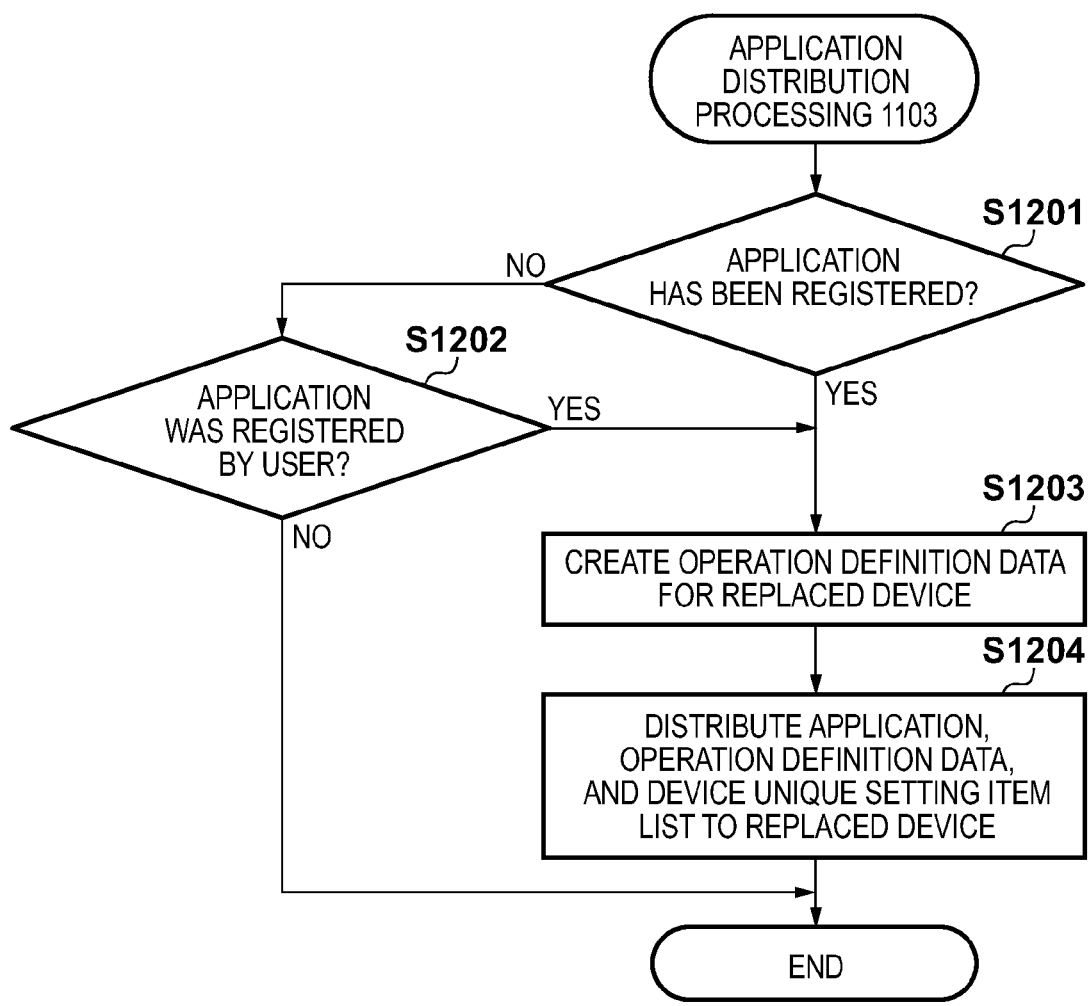
FIG. 12 is a flowchart illustrating a process in step S1103 in the first embodiment in detail.

FIG. 12 is a flowchart illustrating the processing in step S1103 in detail. In step S1201 in the flowchart, the application management unit 407 determines whether or not the device transition application that is to be distributed to the replacement target device exists in the application database 411. If it is determined that the device transition application exists, processing proceeds to step S1203. If not, processing proceeds to step S1202.

In step S1202, the application management unit 407 determines whether or not the device transition application was registered by the user, via the UI control unit 401. If it is determined that the device transition application was registered by the user, processing proceeds to step S1203. If not, the flowchart ends.

In step S1203, the application management unit 407 creates operation definition data for defining the operation of the replacement target device. The created operation definition data is temporarily stored in the RAM 203 or the HDD 212. An exemplary screen for creating the operation definition data will be described later with reference to FIG. 13.

In step S1204, the application management unit 407 distributes the device transition application, the operation definition data, and the device-unique setting item list to the replacement target device, via the communication unit 408. Note that the device-unique setting item list is used when the replacement target device transitions to an operational state designated by the operation definition data in step S1604 in FIG. 16, which will be described later. The description of the flowchart in FIG. 12 ends here.

Operation Definition Data Creation Screen

Figure 13:
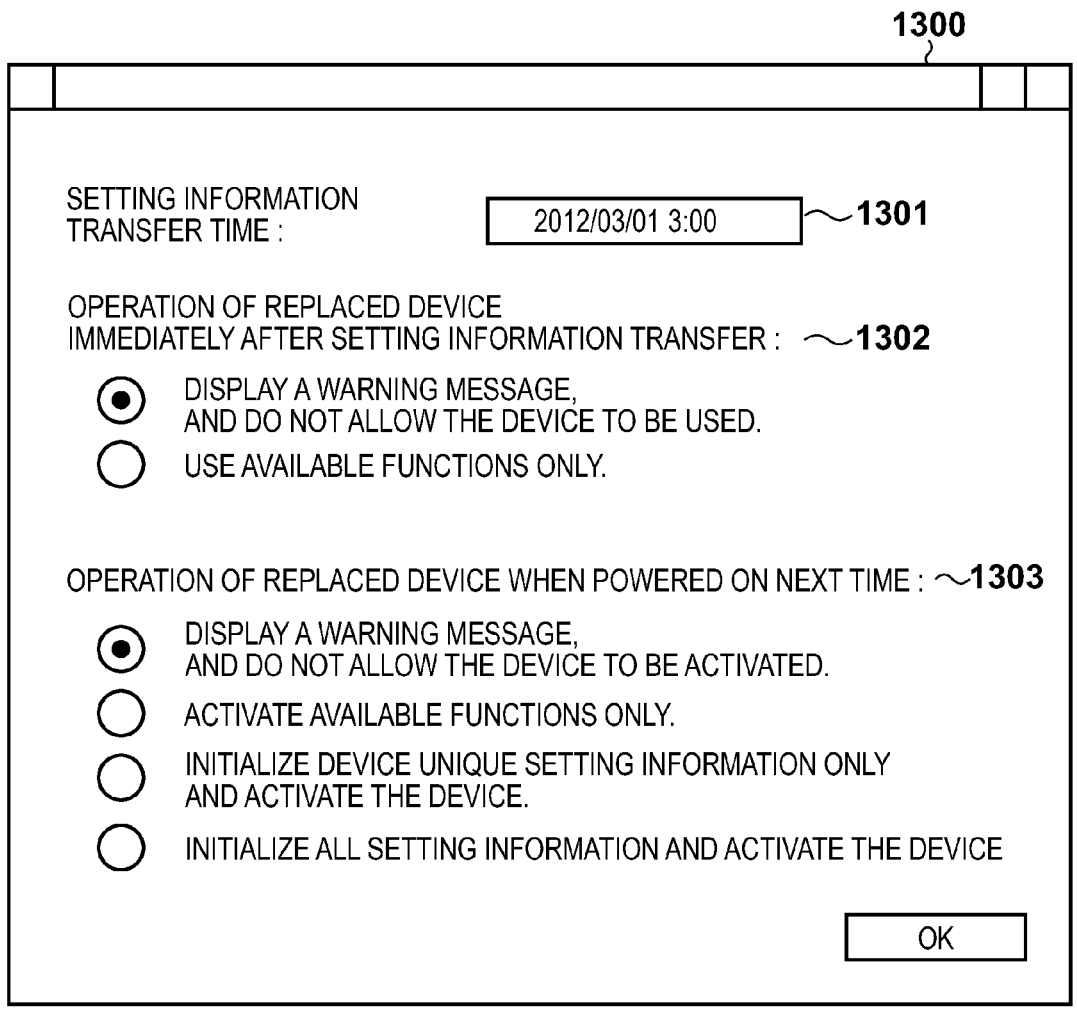
FIG. 13 is a diagram showing an exemplary screen for creating operation definition data.

FIG. 13 shows an exemplary screen for creating the operation definition data in step S1203. In a box of the "setting information transfer time" 1301, the time when the management apparatus 101 distributes the setting information to the new device (the device 104 in the present embodiment) is input. The setting information transfer time is, so to speak, the time when transfer of the setting information to the new device is enabled. Provisional operation mode designation 1302 receives the input of the operation mode that is to be applied to the replacement target device when the time designated in the setting information transfer time 1301 is reached. In this diagram, "Display a warning message, and do not allow the device to be used." and "Use available functions only." are selectable. Next-activation operation mode designation 1303 receives the input of the operation mode to be applied when the replacement target device is powered on the next time. In this diagram, "Display a warning message, and do not allow the device to be activated.", "Activate available functions only.", "Initialize device-unique setting information only and activate the device.", and "Initialize all setting information and activate the device" are selectable.

Distribution Request Creation Screen

Figure 14:
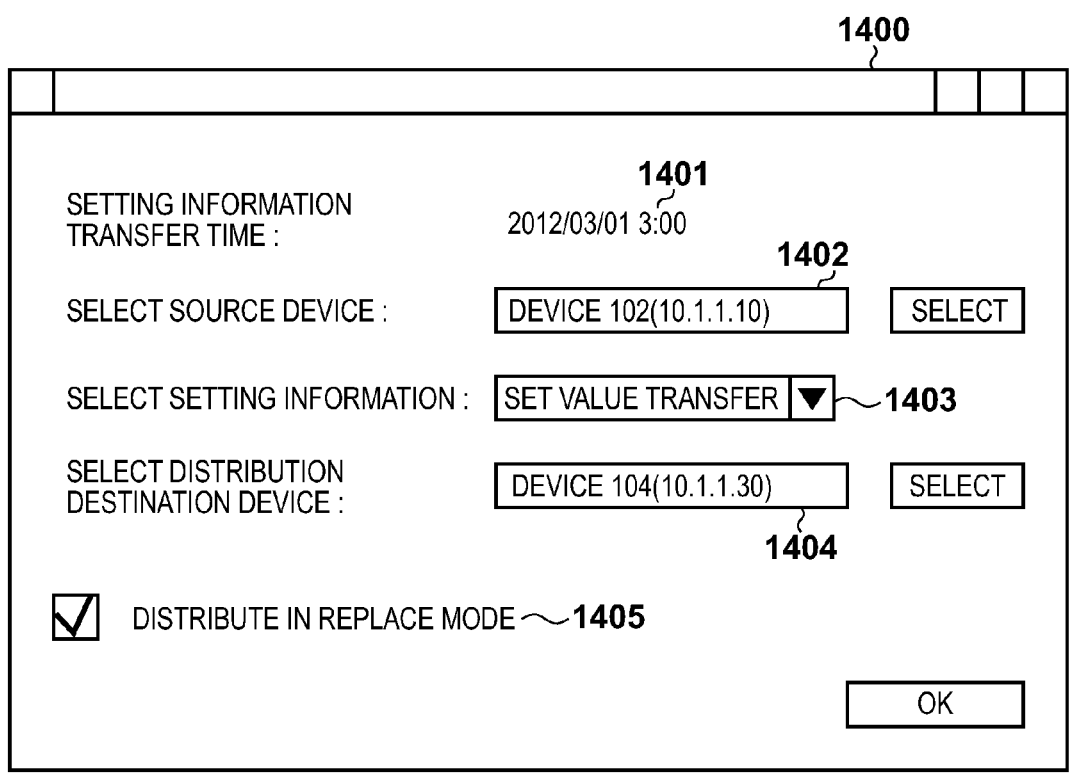
FIG. 14 is a diagram showing an exemplary screen for creating a setting information distribution request.

FIG. 14 shows an exemplary screen for creating the setting information distribution request in step S1104. The time when the management apparatus 101 distributes the setting information to the new device (the device 104 in the present embodiment) is displayed in setting information transfer time 1401 in the distribution request creation screen 1400. The time displayed in setting information transfer time 1401 is the same as the time input in the setting information transfer time 1301 in FIG. 13.

Acquisition source device selection 1402 accepts the input of information of the device from which the setting information to be distributed was obtained. In the exemplary text box shown in this diagram, information for identifying the obtaining source device may be directly input, or the result of selection made in the device selection screen 800 that is called by a selection button pressed by the user may be input. In the present embodiment, the device selected in obtaining source device selection 1402 is the device 102, which is the replacement target device.

A list of the setting information obtained from the device selected in the obtaining source device selection 1402 is displayed in setting information selection 1403. The setting information displayed in the list is only information regarding the device selected in the box for obtaining source device selection 1402, among the setting information stored in the device setting information list 900. Note that although a drop-down list is used as an example of UI control for displaying the setting information list in this diagram, other kinds of UI control may alternatively be used as long as the user can designate a single piece of setting information.

Distribution destination device selection 1404 receives the input of information of the device to which the setting information selected in the box for setting information selection 1403 is distributed. The operation when the selection button is pressed is the same as that in the obtaining source device selection 1402. In the present embodiment, the device selected in the distribution destination device selection 1404 is the device 104, which is the new device.

A replace mode check box 1405 is used for designating whether or not to perform distribution in the replace mode when the management apparatus 101 distributes the setting information to the distribution destination device. The difference in operation between the case where the replace mode is designated and the case where the replace mode is not designated is that when the replace mode is not designated, the setting information of the devices is updated such that both the replacement target device and the new device can be connected to the network, whereas when the replace mode is designated, the setting information and the like are updated based on the assumption that the replacement target device will be disconnected from the network. Specifically, designation of the replace mode is determined in step S1106 in the flowchart in FIG. 11 and in step S1703 in FIG. 17. The setting items and their respective values designated with the UI in FIG. 14 are delivered to the setting information management unit 403 via the UI control unit 401. The setting information management unit 403 temporarily holds the delivered setting items and values in the RAM 203 or the HDD 212.

Operation of Replacement Target Device

Figure 15:
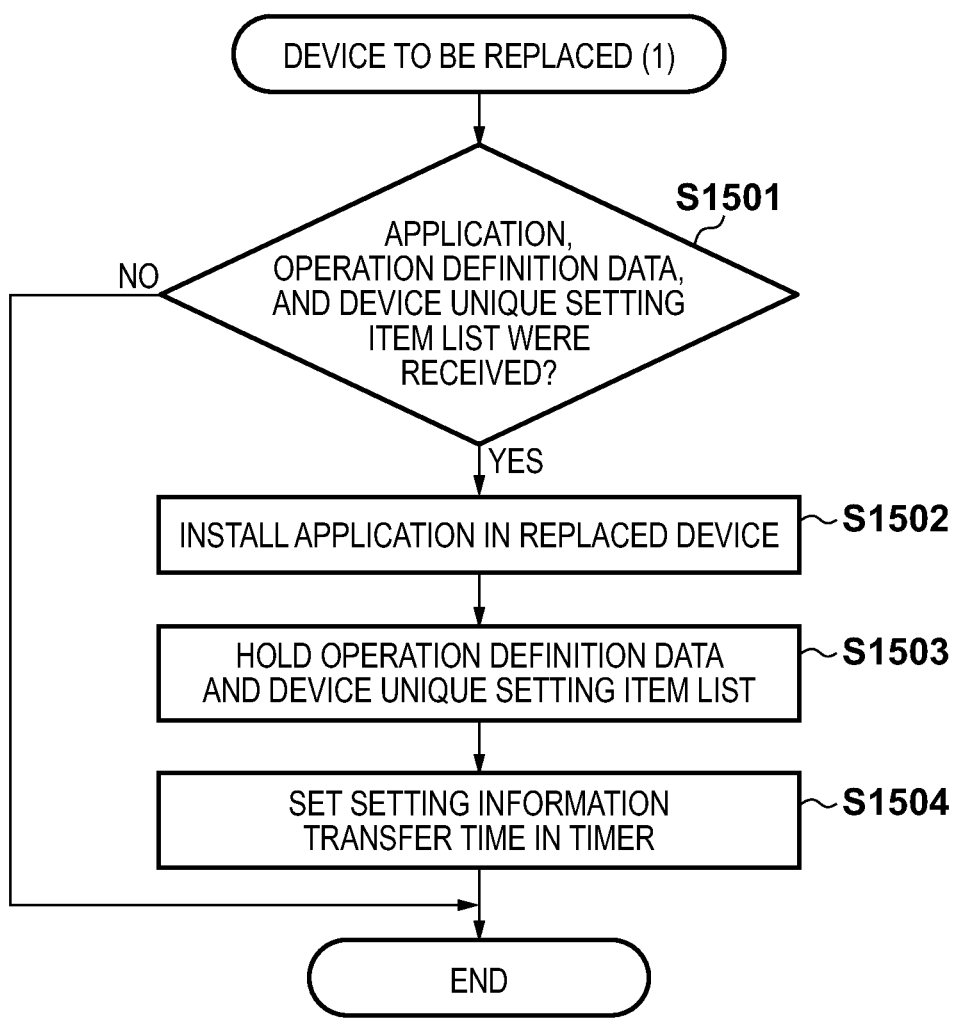
FIG. 15 is a flowchart for a replacement target device in the first embodiment.

FIG. 15 is a flowchart illustrating the operation of the replacement target device when receiving the device transition application, the operation definition data, and the device-unique setting item list that are distributed by the management apparatus 101 in step S1204 in FIG. 12.

In step S1501 in FIG. 15, the application management unit 604 determines whether or not the device transition application, the operation definition data, and the device-unique setting item list were received from the management apparatus 101. If it is determined that they were received, processing proceeds to step S1502. If not, the processing of this flowchart ends.

In step S1502, the application installer 605 receives the application from the application management unit 604 and executes application installation processing. In the present embodiment, it is assumed that the installed application is the application 607 in FIG. 6, that is to say, the device transition application.

In step S1503, the application management unit 604 holds the received operation definition data and device-unique setting item list in the RAM 303 or the HDD 304.

In step S1504, the device transition application 607 reads out the value of the setting information transfer time in the operation definition data from the RAM 303 or the HDD 304, and sets this value in a timer module (not shown). Here, the timer module is a module for notifying a time-setting source (here, the application 607) that the set time has been reached when the time set by the time-setting source is reached. The description of the flowchart in FIG. 15 ends here. Note that if an option for automatic execution of the application after being downloaded is available, this option is selected for the device transition application in the present embodiment, and the device transition application is automatically executed after installation or after step S1504. Note that if the installed application cannot be automatically executed, activation of the device transition application by the user will be awaited.

Figure 16:
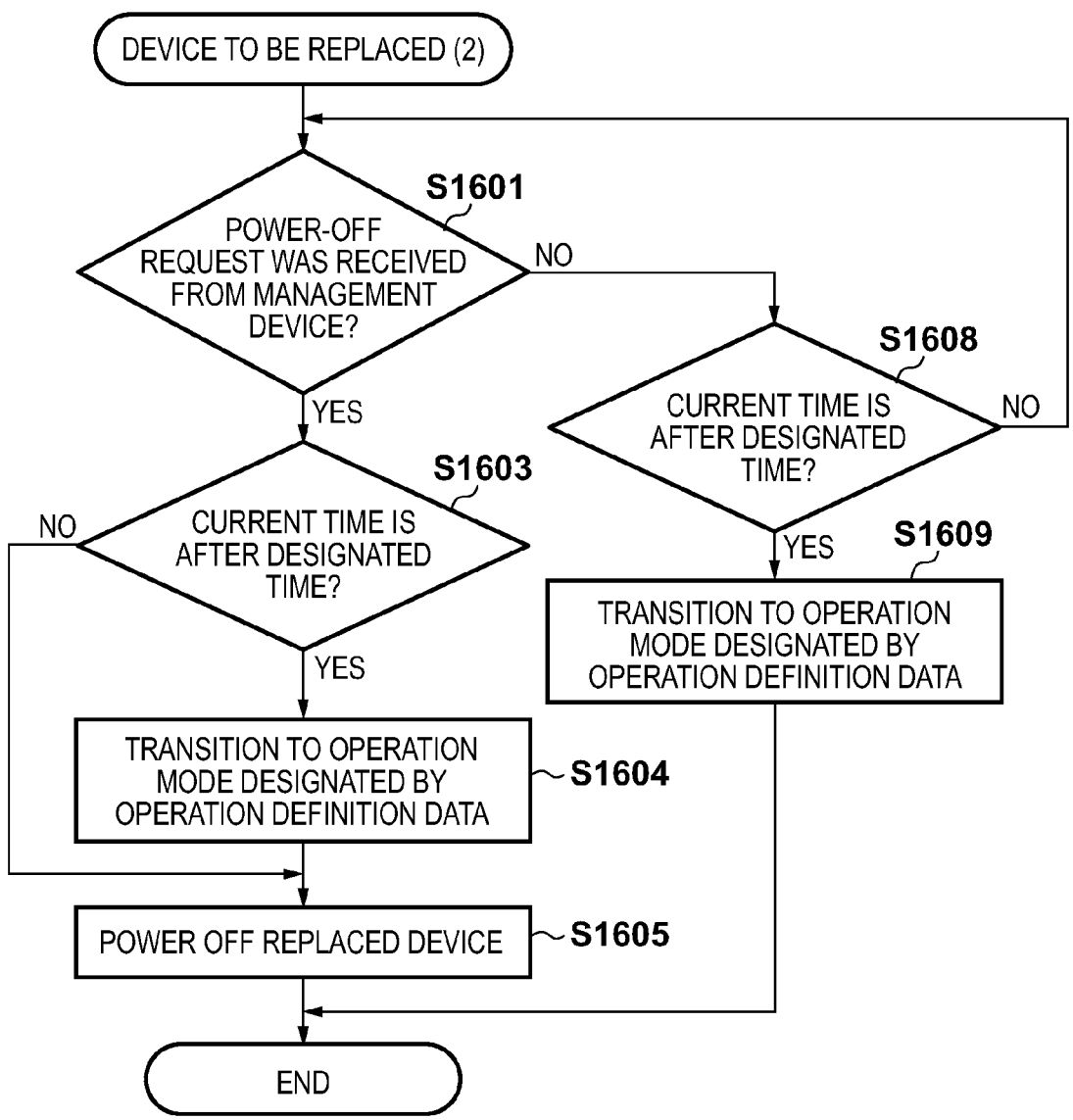
FIG. 16 is a flowchart executed subsequently to the flowchart in FIG. 15.

FIG. 16 is a flowchart for the device transition application according to the present embodiment that is executed by the replacement target device subsequently to the flowchart in FIG. 15. If the application can be automatically executed, the procedure in FIG. 15 is executed immediately after installation of the device transition application. If it needs to be activated manually, it is executed in accordance with an activation instruction by the user. Note that if the device transition application has not been installed, the device receives the power-off request issued in step S1109 in FIG. 11, and the control unit 602 powers off the device by means of a remote power-off function that the device originally has. This procedure is not shown in the flowchart.

In step S1601 in the flowchart, the device transition application 607 determines whether or not the power-off request issued in step S1109 was received.

If it is determined that it was received, processing proceeds to step S1603. If not, processing proceeds to step S1608.

In step S1603, the device transition application 607 determines whether or not the current time is after the setting information transfer time that is set in the timer module in step S1504. If a notification from the timer module is received and it is determined that the current time is after the setting information transfer time, processing proceeds to step S1604. If not, processing proceeds to step S1605.

In step S1604, the device transition application 607 makes a request for processing according to the operation mode designated by the operation definition data to the controller module 602 in order to change the operation of the replacement target device. In the present embodiment, two operation modes are described as the operation modes designated by the operation definition data. The two operation modes are a provisional operation mode designated in the provisional operation mode designation 1302, and a next-activation operation mode designated in the next-activation operation mode designation 1303. For example, if "Use available functions only." is designated in the provisional operation mode, the device transition application 607 refers to the device-unique setting item list received in step S1503, and determines unavailable functions. The device-unique setting item list contains the device name, the installation location, and the IP address. Even if the respective set values of the device name and the installation location of the replaced device are the same as those of the replacement device, it will not cause a problem in the system according to the present embodiment.

Meanwhile, if the set value of the IP address of the replaced device is the same as that of the replacement device, it causes a problem in the system. Accordingly, the device transition application 607 determines a "network function", which is a function involving the IP address, to be an unavailable function, and makes a request for stopping the network function to the controller module 602. Upon receiving the request, the controller module 602 stops the operation of the network interface 306. The device transition application 607 subsequently determines the operation in the case of the next-activation operation mode, as in the case of the provisional operation mode, and makes a processing request to the controller module 602. Regarding the processing request, for example, an operation mode set for the time of next activation is stored as a parameter for the time of activation in a predetermined storage area. The controller module 602 refers to the parameter for the time of next activation, and activates the device in the operation mode according to the parameter. Note that although the replacement target device in the present embodiment is configured to receive the device-unique setting item list from the management apparatus 101, an alternative configuration may be employed in which the device-unique setting item list is held in advance in the RAM 303 or the HDD 304 in the replacement target device. In this case, the management apparatus 101 does not send the device-unique setting item list in step S1204. Further, the replacement target device does not receive the device-unique setting item list in step S1501, nor hold the device-unique setting item list in step S1503.

That is to say that in step S1604, it changes the function that is currently provided, as designated by the provisional operation mode, and sets the parameter for determining the operational state after being activated the next time to the value designated by the next-activation operation mode.

Next, in step S1605, the controller module 602 executes processing for powering off the replacement target device.

Step S1608, which is executed in the case where it is determined in step S1601 that the power-off request was not received from the management apparatus 101, is the same as step S1603. If, in step S1608, a notification from the timer module is received and it is determined that the current time is after the setting information transfer time, processing proceeds to step S1609. If not, processing returns to step S1601. Step S1609 is the same as step S1604. That is to say, the replacement target device transitions to the designated operation mode in synchronization with the designated time to distribute the setting information to the new device, and restriction on the function using the unique setting information is started. The description of the flowchart in FIG. 16 ends here.

Operation of New Device

Figure 17:
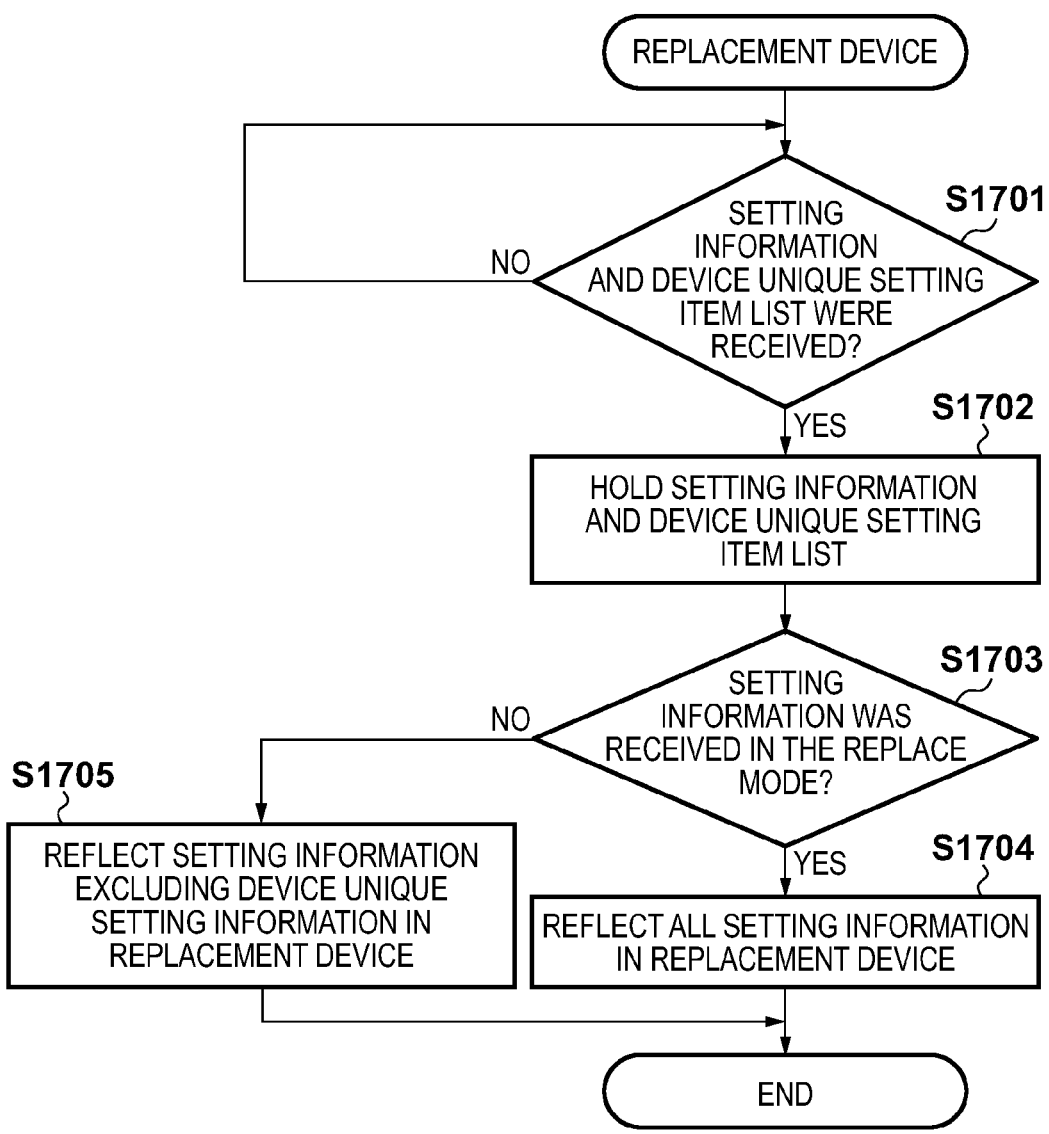
FIG. 17 is a flowchart for a new device in the first embodiment.

FIG. 17 is a flowchart illustrating the operation of the new device when receiving the setting information distributed by the management apparatus 101 in step S1112 in FIG. 11. In step S1701 in the flowchart, the controller module 602 determines whether or not the setting information and the device-unique setting item list were received from the management apparatus 101. If it is determined that they were received, processing proceeds to step S1702. If not, processing returns to step S1701.

In step S1702, the controller module 602 holds the received setting information and device-unique setting item list in the RAM 303 or the HDD 304.

In step S1703, the controller module 602 determines whether or not the setting information was received in the replace mode. If it is determined that it was received in the replace mode, processing proceeds to step S1704. If not, processing proceeds to step S1705.

In step S1704, the controller module 602 writes all setting information in the HDD 304 so as to reflect it in the new device.

In step S1705, the controller module 602 writes the setting information excluding the device-unique setting information in the HDD 304 so as to reflect it in the new device. The controller module 602 uses the device-unique setting item list held in step S1702 in order to distinguish the device-unique setting information. Note that although the new device in the present embodiment is configured to receive the device-unique setting item list from the management apparatus 101, an alternative configuration may be employed in which the device-unique setting item list is held in advance in the RAM 303 or the HDD 304 in the new device. In this case, the management apparatus 101 does not send the device-unique setting item list in step S1112. Further, the new device does not receive the device-unique setting item list in step S1701, nor hold the device-unique setting item list in step S1702. The description of the flowchart in FIG. 17 ends here.

With the above-described system, configuration of the devices belonging to the system, and procedures of the devices, the settings of the replacement target device can be easily and reliably duplicated in the new device when the device connected to the network is replaced. Furthermore, the device-unique setting information of the new device can be provided, depending on whether or not both the replacement target device and the new device are allowed to exist in the system, based on designation of the replace mode. Furthermore, if the replace mode is designated, the time to power off the replacement target device can be designated, and it is thereby possible to prevent a state where both the replacement target device and the new device exist in the system. On the other hand, if the replace mode is not designated, the setting information excluding the device-unique setting information of the replacement target device is duplicated in the new device such that the device-unique setting information, such as a network address represented by the IP address, in the replacement target device does not overlap with that of the new device, and both the replacement target device and the new device can thus exist in the network.

Note that although the present embodiment describes the device management software that operates on the management apparatus 101, the device management software may alternatively operate on the device 102 (replacement target device), the device 103, or the device 104 (new device), for example. If the device management software operates on the device 102, step S1605 in FIG. 16 is performed after step S1112 in FIG. 11. Further, the communication between the network I/F 306 and the communication unit 408 described in the present embodiment is performed through the system bus 310.

Second Embodiment

The difference between the present embodiment and the first embodiment lies in that in the present embodiment, the function given by the device transition application in the first embodiment is provided as a function originally provided in the replacement target device. For this reason, in the present embodiment, the replacement target device can be transitioned to the operation mode designated in the operation definition data, without installing the device transition application. Since the operation definition data is created in advance and set in this device, transition of the operation mode is performed upon receiving a power-off instruction from the management apparatus. However, the transfer time is not designated since it is difficult to set the transfer time in advance. However, the replacement target device in the present embodiment is a device in which application installation is also possible, and can also be operated as the replacement target device in the first embodiment by downloading the application and the operation definition data (including designation of the transfer time) from the management apparatus. Hereinafter, the difference between the present embodiment and the first embodiment will be described with reference to FIG. 18, which is a procedure employed in place of FIG. 16 of the first embodiment. The steps with the same content as those in FIG. 16 are given the same reference numerals. However, what executes step S1601 is different. FIG. 18 is not executed only by the device transition application, but initially, the controller module 602 starts execution. That is to say, in the present embodiment, the device transition application does not need to be automatically executed after installation.

FIG. 18 is a flowchart for the device transition application according to the present embodiment that is executed by the replacement target device subsequently to the flowchart in FIG. 15. In step S1601 in the flowchart, the controller unit 602 determines whether or not the power-off request issued in step S1109 was received. If it is determined that it was received, processing proceeds to step S1602. If not, processing proceeds to step S1608.

In step S1602, the application management unit 604 determines whether or not the device transition application has been installed. If it is determined that it has been installed, the application management unit 604 activates the device transition application, and processing proceeds to step S1603. Steps S1603 and S1604 are executed by the device transition application. On the other hand, if it has not been installed yet, processing proceeds to step S1606.

In step S1603, the device transition application 607 determines whether or not the current time is after the setting information transfer time that is set in the timer module in step S1504. If a notification from the timer module is received and it is determined that the current time is after the setting information transfer time, processing proceeds to step S1604. If not, processing proceeds to step S1605.

In step S1604, the device transition application 607 makes a request for processing according to the operation mode designated by the operation definition data to the controller module 602 in order to change the operation of the replacement target device. In the present embodiment, two operation modes are described as the operation modes designated by the operation definition data. The two operation modes are a provisional operation mode designated in the provisional operation mode designation 1302, and a next-activation operation mode designated in the next-activation operation mode designation 1303. Step S1604 is the same as that in the first embodiment, and will not be described here in detail.

Next, in step S1605, the controller module 602 executes processing for powering off the replacement target device.

In step S1606, which is executed when it is determined that the device transition application is not yet installed in step S1602, the controller module 602 determines whether or not the operation definition data was created in advance in the replacement target device. The method for creating the operation definition data on the replacement target device is the same as that shown in FIG. 13, and will not be described here. If it is determined that the operation definition data was created in advance, processing proceeds to step S1607. If not, processing proceeds to step S1605. Step S1607 is the same as step S1604, and will not be described here. However, step S1607 is different from step S1604 in that step S1607 is executed by the control unit 602.

In step S1608, which is executed when it is determined in step S1601 that the power-off request was not received from the management apparatus 101, it is determined whether the designated time has been reached. If it is determined that the current time is after the setting information transfer time, processing proceeds to step S1609. If not, processing returns to step S1601. Note that if the designated time is not set in the timer, the determination result in step S1608 is "No". Since processing is branched to step S1609 only when the device transition application is already installed, the device transition application is initially activated, and then step S1609 is executed.

As described above, according to the present embodiment, the setting information can be easily and reliably transferred between the replaced device and the replacement device, even in the case where the device transition application is not distributed. In the case where the device transition application is distributed, transfer of the setting information using the device transition application can be realized as in the first embodiment, and the same effect as that in the first embodiment can be achieved.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-255510, filed Nov. 21, 2012, which is hereby incorporated by reference herein in its entirety.

What is claimed is:

1. A management apparatus for distributing setting information to a network device, comprising:
a display unit configured to control displaying of a screen for designating a replace mode and a network device which is a distribution destination of the setting information, wherein the setting information including the unique setting information that is unique in a network is duplicated in the replace mode, and a time to distribute is displayed in the screen;
an obtaining unit configured to obtain the setting information including the unique setting information, from a replacement target network device, wherein the unique setting information includes device name information and network address information;
a distribution unit configured to distribute the setting information to a new network device as a distribution destination in the replace mode according to the designation on the screen;
a transmission unit configured to transmit an instruction to restrict use of the unique setting information to the replacement target network device; and
a determination unit configured to determine whether or not the management apparatus has an application having a function of restricting a function to be provided, in order to restrict use of the unique setting information,
wherein if it is determined that the management apparatus has the application, the transmission unit transmits the application to the replacement target network device, and
wherein the transmission unit transmits a power-off instruction to the replacement target network device if the application has not yet been transmitted to the replacement target network device, or if the time to distribute the setting information to the new network device has not yet been reached.

2. The management apparatus according to claim 1, wherein the instruction is an instruction to power off the replacement target network device.

3. The management apparatus according to claim 1, wherein the instruction further includes definition data for defining the function to be provided, the definition data being transmitted together with the application.

4. The management apparatus according to claim 1, wherein the instruction is an instruction to initialize at least the unique setting information.

5. The management apparatus according to claim 1, wherein the instruction includes a time to distribute the setting information to the new network device,
the distribution unit distributes the setting information to the new network device when the time is reached, and
restriction on use of the unique setting information in the replacement target network device is started in synchronization with the time.

6. A non-transitory computer-readable medium in which a program for causing a computer connected, together with a network device, to a network to execute a method, said method comprising:
controlling displaying of a screen for designating a replace mode and a network device which is a distribution destination of the setting information, wherein the setting information including the unique setting information that is unique in a network is duplicated in the replace mode, and a time to distribute is displayed in the screen;
obtaining the setting information including the unique setting information, from a replacement target network device, wherein the unique setting information includes device name information and network address information;
distributing the setting information to a new network device as a distribution destination in the replace mode according to the designation on the screen;
transmitting an instruction to restrict use of the unique setting information to the replacement target network device; and
determining whether or not the management apparatus has an application having a function of restricting a function to be provided, in order to restrict use of the unique setting information, wherein if it is determined that the management apparatus has the application, the application is transmitted to the replacement target network device, and wherein a power-off instruction is transmitted to the replacement target network device if the application has not yet been transmitted to the replacement target network device, or if the time to distribute the setting information to the new network device has not yet been reached.

7. A management method for distributing setting information to a network device by a management apparatus, the method comprising:

controlling displaying of a screen for designating a replace mode and a network device which is a distribution destination of the setting information, wherein the setting information including the unique setting information that is unique in a network is duplicated in the replace mode, and a time to distribute is displayed in the screen;

obtaining the setting information including the unique setting information, from a replacement target network device, wherein the unique setting information includes device name information and network address information;

distributing the setting information to a new network device as a distribution destination in the replace mode according to the designation on the screen;

transmitting an instruction to restrict use of the unique setting information to the replacement target network device; and determining whether or not the management apparatus has an application having a function of restricting a function to be provided, in order to restrict use of the unique setting information, wherein if it is determined that the management apparatus has the application, the application is transmitted to the replacement target network device, and wherein a power-off instruction is transmitted to the replacement target network device if the application has not yet been transmitted to the replacement target network device, or if the time to distribute the setting information to the new network device has not yet been reached.

\* \* \* \* \*